United States Patent
Willis et al.

(10) Patent No.: US 10,401,519 B2
(45) Date of Patent: Sep. 3, 2019

(54) NOISE REMOVAL FOR DISTRIBUTED ACOUSTIC SENSING DATA

(71) Applicant: Halliburton Energy Services, Inc., Houston, TX (US)

(72) Inventors: Mark Elliott Willis, Katy, TX (US); Oscar Augusto Barrios, Conroe, TX (US); Victor K. Leung, Houston, TX (US); Andreas Ellmauthaler, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 106 days.

(21) Appl. No.: 15/035,084

(22) PCT Filed: Jul. 17, 2015

(86) PCT No.: PCT/US2015/041032
§ 371 (c)(1),
(2) Date: May 6, 2016

(87) PCT Pub. No.: WO2016/011431
PCT Pub. Date: Jan. 21, 2016

(65) Prior Publication Data
US 2017/0090054 A1 Mar. 30, 2017

Related U.S. Application Data

(60) Provisional application No. 62/025,740, filed on Jul. 17, 2014.

(51) Int. Cl.
*G01V 1/42* (2006.01)
*G01V 1/36* (2006.01)
*G01H 9/00* (2006.01)

(52) U.S. Cl.
CPC .............. *G01V 1/364* (2013.01); *G01H 9/004* (2013.01); *G01V 1/42* (2013.01);
(Continued)

(58) Field of Classification Search
CPC .......... G01V 1/42; G01V 1/364; G01H 9/004; E21B 47/14
See application file for complete search history.

(56) References Cited

U.S. PATENT DOCUMENTS

| 4,853,903 | A | 8/1989 | Linville, Jr. et al. |
| 6,393,365 | B1 | 5/2002 | Runnestrand et al. |

(Continued)

OTHER PUBLICATIONS

International Preliminary Report on Patentability issued in related Application No. PCT/US2015/041032, dated Jan. 26, 2017 (14 pages).

(Continued)

*Primary Examiner* — Bryan Bui
(74) *Attorney, Agent, or Firm* — Benjamin Fite; Baker Botts L.L.P.

(57) ABSTRACT

An example system for noise removal in distributed acoustic sensing data may include a distributed acoustic sensing (DAS) data collection system and an information handling system coupled thereto. The information handling system may receive seismic information from the DAS data collection system. The seismic information may include seismic traces associated with a plurality of depths in the wellbore. The information handling system may also generate a noise pilot trace by stacking one or more of the seismic traces, and subtract the noise pilot trace from the seismic information received from the DAS data collection system.

33 Claims, 7 Drawing Sheets

(52) U.S. Cl.
CPC ............... *G01V 2210/1295* (2013.01); *G01V 2210/1429* (2013.01); *G01V 2210/322* (2013.01); *G01V 2210/3246* (2013.01)

(56) References Cited

U.S. PATENT DOCUMENTS

| | | |
|---|---|---|
| 6,681,184 B2 * | 1/2004 | Jenner .................... G01V 1/303 367/51 |
| 2010/0329079 A1 | 12/2010 | Hegge et al. |
| 2012/0035854 A1 | 2/2012 | Kragh et al. |
| 2012/0111560 A1 | 5/2012 | Hill et al. |
| 2013/0242698 A1 | 9/2013 | McEwen-King et al. |
| 2016/0245077 A1 * | 8/2016 | Willis .................... E21B 47/102 |

OTHER PUBLICATIONS

International Search Report and Written Opinion issued in related PCT Application No. PCT/US2015/041032 dated Oct. 15, 2015, 17 pages.

Extended European Search Report issued in related EP Application No. 15822748.8, dated Dec. 12, 2017 (8 pages).

Daley et al. "Field Testing of Fiber-Optic Distributed Acoustic Sensing (DAS) for subsurface seismic monitoring", The Leading Edge, Jun. 1, 2013, XP055429711, GB, ISBN: 978-1-4665-6493-0; pp. 699-706.

Li et al. "A Permanent Borehole Fiber-Optic Distributed Acoustic Sensing Experiment", SEG Technical Program Expanded Abstracts 2013, Aug. 19, 2013, XP055429707, pp. 5057-5061.

\* cited by examiner

NOISE REMOVAL FOR DISTRIBUTED ACOUSTIC SENSING DATA

CROSS-REFERENCE TO RELATED APPLICATIONS

This application is a U.S. National Stage Application of International Application No. PCT/US2015/041032 filed Jul. 17, 2015, which claims priority to U.S. Provisional Application No. 62/025,740 filed Jul. 17, 2014, both of which are incorporated herein by reference in their entirety for all purposes.

BACKGROUND

This disclosure generally relates to monitoring of hydrocarbon wellbores. In particular, this disclosure relates to systems and methods for monitoring a wellbore using Distributed Acoustic Sensing (DAS).

Acoustic sensing based on DAS may use the Rayleigh backscatter property of a fiber's optical core and may spatially detect disturbances that are distributed along the fiber length. Such systems may rely on detecting phase changes brought about by changes in strain along the fiber's core. Externally-generated acoustic disturbances may create very small strain changes to optical fibers. The acoustic disturbance may also be reduced or masked by a cable in which the fiber is deployed. DAS techniques may be used to collect vertical seismic profile (VSP) information about a formation.

Data generated by current DAS systems may include artifacts. These artifacts may be caused by the method of measurement used by the DAS systems, such as by measuring disturbances at different distances along the fiber length.

BRIEF DESCRIPTION OF THE DRAWINGS

These drawings illustrate certain aspects of certain embodiments of the present disclosure. They should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure describes a method for removing noise from seismic information collected using distributed acoustic sensing (DAS) systems. For instance, in certain embodiments, vertical seismic profile (VSP) information may be collected using DAS systems instead of using geophones, as traditional systems use. To collect VSP data, a vibrational source at the surface of a wellbore may generate seismic waves through the formation. Typically, these seismic waves may be detected using geophones placed in or near the wellbore of a drilling system. However, using DAS techniques, the seismic waves propagating in the formation may be detected using a fiber optic cable present in or near to the wellbore. In particular, the seismic waves in the formation may cause strain changes in the fiber optic cable of the DAS system, and these strain changes may be measured using DAS techniques such as those described further below.

Data collection using DAS systems may be more efficient that using traditional geophones. For example, geophones may need to be physically raised and/or lowered for every depth sample (i.e., channel) of seismic information to be collected, which may take several minutes or hours to perform. In contrast, using DAS techniques as described herein, data for all depths (i.e., channels) may be collected by sending optical pulses every few milliseconds for a few seconds down a fiber optic cable in the wellbore.

However, artifacts inherent to DAS data collection may be present in collected DAS data. As one example, the appearance of seemingly infinite velocity events which occur across all channels (i.e., depths) at the same time may be present in the recorded DAS data. These artifacts may be from components of the DAS system themselves or from vibrational sources for the VSP data causing vibrations in the DAS system. These types of events may persist in time throughout the data, or they can be isolated events which contaminate only a discrete time window of the data. Other methods of removing this type of noise apply either frequency-wavenumber filtering, tau-p filtering and/or notch filtering. Each of these methods can be effective for removing noise; however, they can also introduce unwanted side effects such as smearing of the wanted signal and/or ringing and reverberation of the signal.

Accordingly, embodiments of the present disclosure include systems and methods for reducing infinite or near-infinite velocity noise that may be present in DAS data. More particularly, a noise pilot trace may be created in certain embodiments by stacking all of the collected DAS data traces together. The stacking process may be performed through any suitable means, such as mean stacking or median stacking, or through weighted approaches to those stacking techniques (e.g., weighting particular traces more heavily than others prior to determining a mean). Alternatively, in some embodiments, a subset of the traces can be stacked together to avoid including particular channels or depth levels with obviously large signal values. Since the fiber cable in a DAS system may extend from the surface of a formation to the bottom of a well, many of the recorded DAS channels will not be expected to contain seismic data signals. These "unused" channels will also likely exhibit the consistent channel to channel noise and thus can be specifically selected to form the noise pilot trace in particular embodiments. Once the noise pilot trace has been created, it may be subtracted from the collected DAS data signals to yield more robust DAS data.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described below with respect to one implementation are not intended to be limiting.

Figure 1:
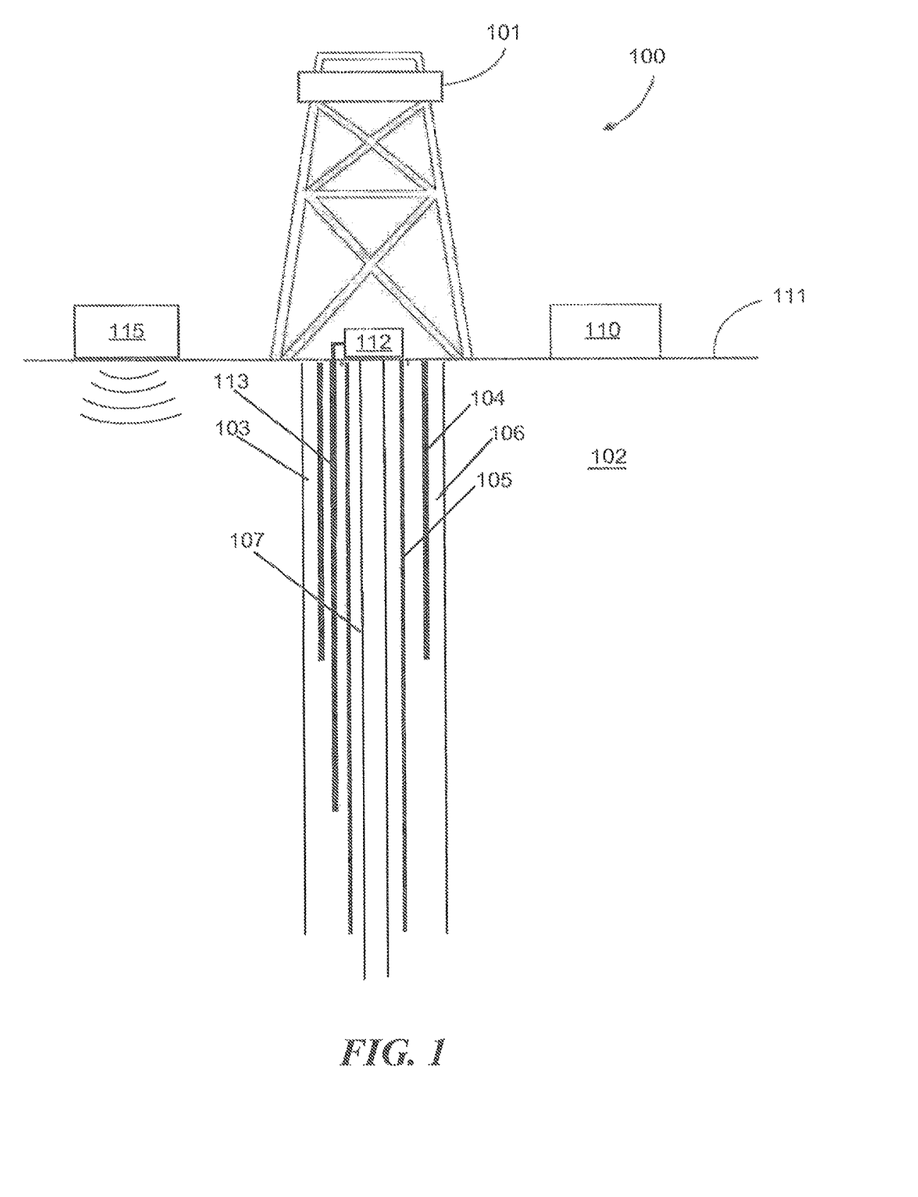
FIG. 1 illustrates an example completed well incorporating a DAS system, in accordance with embodiments of the present disclosure.

FIG. 1 illustrates an example completed well system 100 incorporating a DAS system 112, in accordance with embodiments of the present disclosure. The system 100 includes a rig 101 located at a surface 111 and positioned above a wellbore 103 within a subterranean formation 102. One or more tubulars are positioned within the wellbore 103 in a telescopic fashion. As depicted, the tubulars comprise a surface casing 104 and a production casing 105. The surface casing 104 comprises the largest tubular and is secured in the wellbore 103 via a cement layer 106. The production casing 105 is at least partially positioned within the surface casing 104 and may be secured with respect to the formation 102 and the surface casing 104 via a casing hangar (not shown) and a cement layer. The system 100 further includes tubing 107 positioned within the production casing 105. Other configurations and orientations of tubulars within the wellbore 103 are possible.

As depicted, the system 100 includes a distributed acoustic sensing (DAS) system 112 located at the surface 111. The DAS system 112 may be coupled to an optical fiber 113 that is at least partially positioned within the wellbore 103. As depicted, the fiber 113 is positioned between the surface casing 104 and the production casing 105. The fiber 113 may be secured in place between the surface casing 104 and the production casing 105 such that it functions as a "permanent" seismic sensor. In other embodiments, the fiber 113 may be secured to the tubing 107, for instance, lowered into the wellbore 103 through the inner bore of the tubing 107 in a removable wireline arrangement, or positioned at any other suitable position.

Although illustrated as including one DAS system 112 coupled to optical fiber 113, any suitable number of DAS systems 112 (each coupled to optical fiber 113 located downhole) may be placed inside or adjacent to wellbore 103. With optical fiber 113 positioned inside a portion of wellbore 103, DAS system 112 may obtain information associated with formation 102 based on disturbances caused by seismic source 115. Some examples of seismic sources may include explosives (e.g., dynamite), air guns, thumper trucks, or any other suitable vibration source for creating seismic waves in formation 102. DAS system 112 may thus be configured to collect seismic data along the length of optical fiber 113 based on determined phase changes in light signals. Example DAS systems 112 and their functionality are described further below with respect to FIGS. 2A-2C.

As depicted, the system 100 further includes an information handling system 110 positioned at the surface 111. The information handling system 110 may be communicably coupled to the DAS 112 through, for instance, a wired or wireless connection. The information handling system 110 may receive seismic measurements from the DAS 112 and perform one or more actions that will be described in detail below. The information handling system 110 may comprise a processor and a memory device coupled to the processor, with the memory device containing a set of instructions that cause the processor to perform the actions. Although the information handling system 110 is shown near the wellbore 103, it may also be located remotely. Additionally, the information handling system 110 may receive seismic measurements from a data center or storage server in which the measurements from the DAS 112 were previously stored.

Modifications, additions, or omissions may be made to FIG. 1 without departing from the scope of the present disclosure. For example, the DAS systems and optical fibers may be used during wireline or slickline logging operations before some or all of the tubulars have been secured within the wellbore, and/or before the wellbore 103 is completed. As another example, multiple seismic sources 115 may be used in conjunction with downhole drilling system 100 and DAS system 112. Moreover, components may be added to or removed from system 100 without departing from the scope of the present disclosure.

Figure 2A:
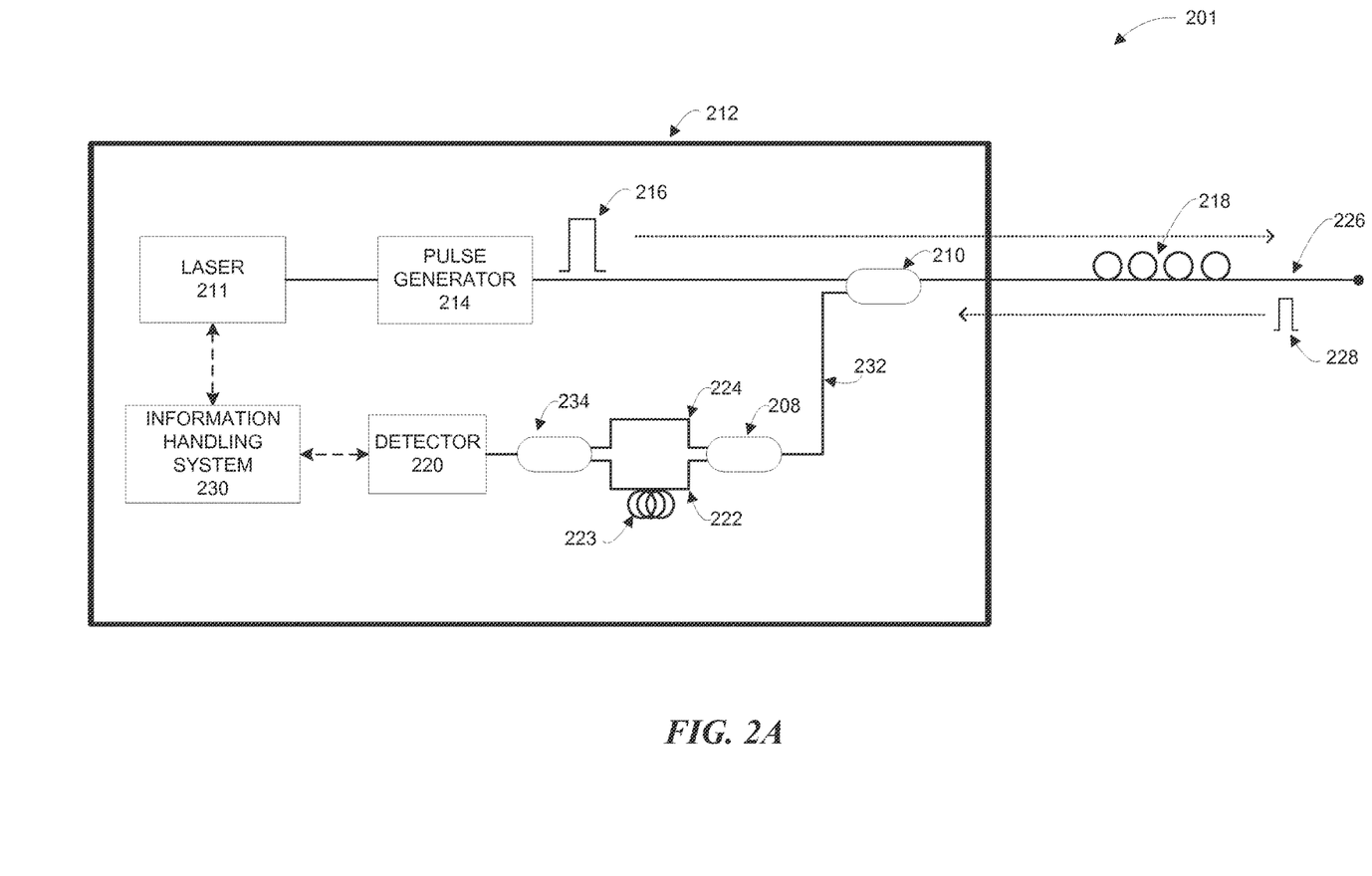
FIGS. 2A-2C illustrate example DAS systems, in accordance with embodiments of the present disclosure.
Figure 2B:
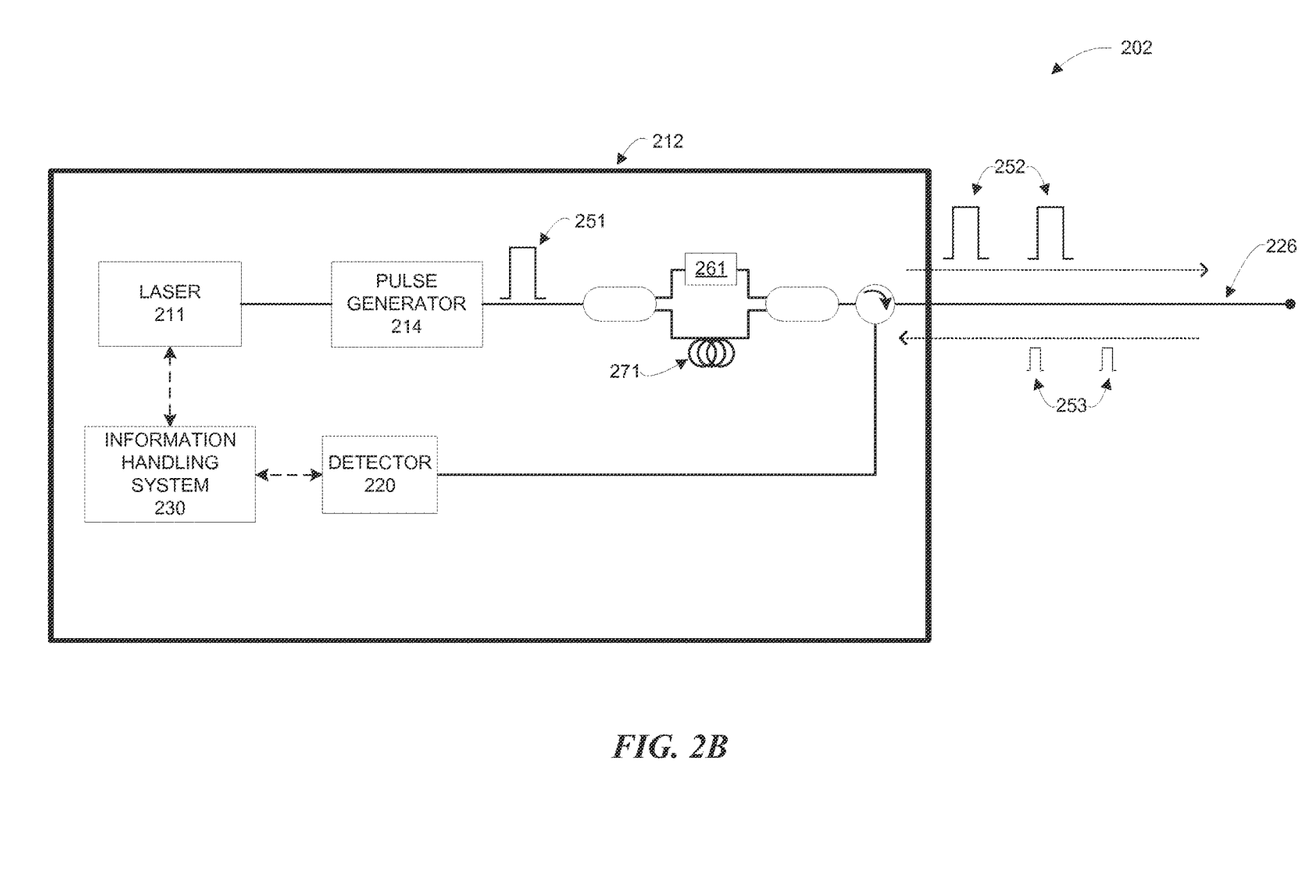
Figure 2C:
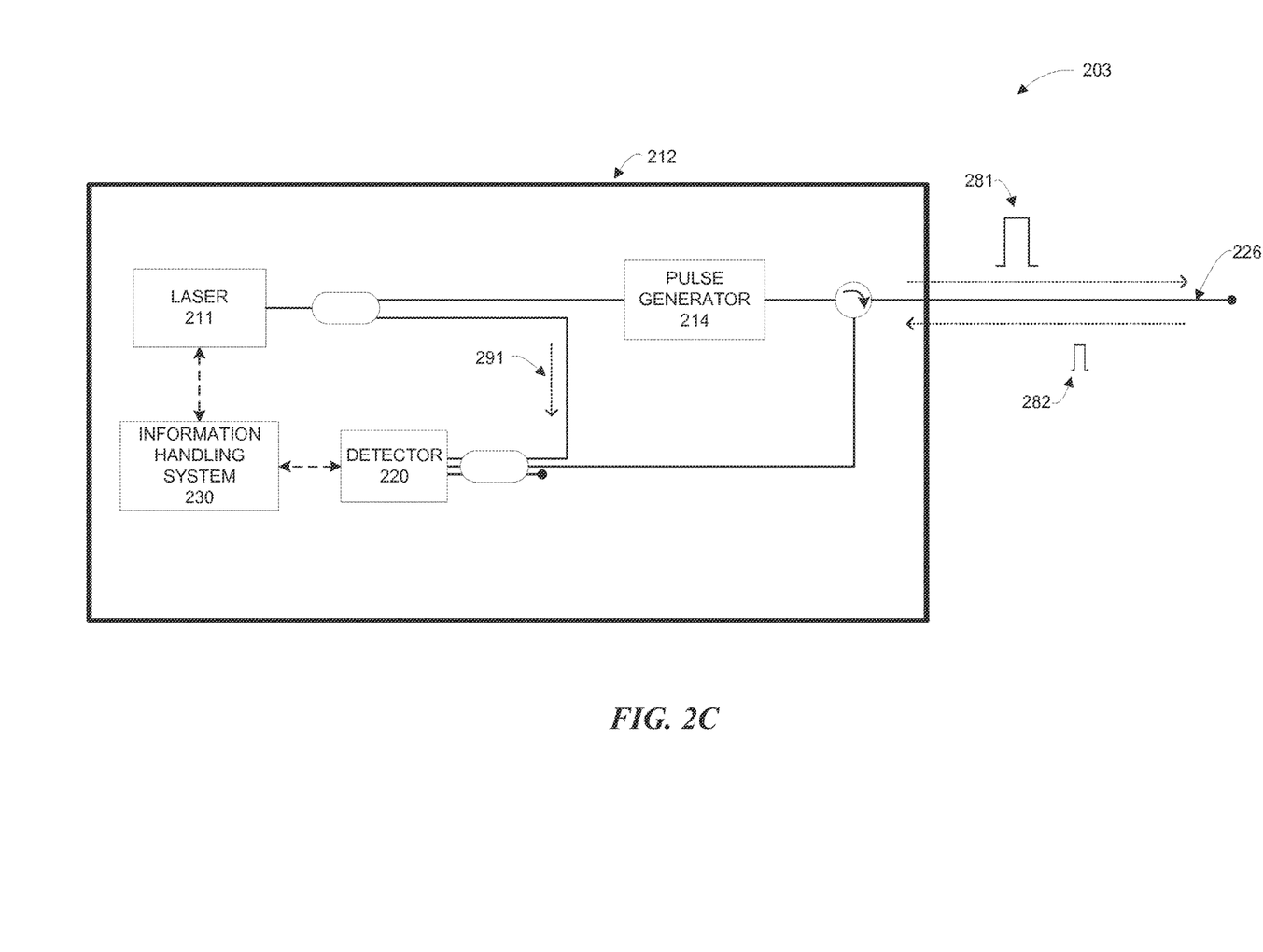

FIGS. 2A-2C illustrate example DAS systems 201-203, in accordance with embodiments of the present disclosure. Any one of DAS systems 201-203 may be incorporated into a system similar system 100 of FIG. 1, and/or used in conjunction with wireline, slickline, coiled tubing in logging operations. DAS systems 201-202 may be single pulse coherent Rayleigh scattering systems with compensating interferometers but are not intended to be limited to such. In particular embodiments, systems 201-203 may be used for phase-based sensing of events in a wellbore (e.g., detecting seismic disturbances along the length of a wellbore) using measurements of coherent Rayleigh backscatter.

Referring to FIG. 2A, a laser 211 and associated pulse generator 214 may be coupled to a first coupler 210 using optical fiber. Laser 211 and pulse generator 214 may be located at any suitable location when performing subterranean operations. For instance, in some embodiments, laser 211 and pulse generator 214 may be located at the surface of the wellbore 103. The pulse generator 214 may include opto-electronics configured to generate interrogating optical pulses 216 using light from laser 211. The first coupler 210 may be a traditional fused type fiber optic splitter, a circulator, a PLC fiber optic splitter, or any other type of splitter known to those with ordinary skill in the art having the benefit of this disclosure. In other embodiments, the first coupler 210 may be a circulator. Optical pulses from the pulse generator 214 may be amplified using optical gain elements, such as any suitable amplification mechanisms including, but not limited to, Erbium Doped Fiber Amplifiers (EDFAs) or Semiconductor Optical Amplifiers (SOAs).

Still referring to FIG. 2A, a second coupler 208 may be coupled to an interferometer. The second coupler 208 may split light from the optical fiber 232 into two paths along interferometer arm 224 and interferometer arm 222. In other words, the second coupler 208 may split the backscattered light (e.g., backscattered light 228) from the optical fiber 232 into a first backscattered pulse and a second backscattered pulse. The first backscattered pulse may be sent into interferometer arm 222. The second backscattered pulse may be sent into interferometer arm 224. The first and second backscattered pulses from interferometer arms 222 and 224 are then re-combined at a third coupler 234 to form an interferometric signal. The first, second, and third couplers 210, 208, and 234 may be a traditional fused type fiber optic splitter, a PLC fiber optic splitter, or any other type of splitter known to those with ordinary skill in the art having the benefit of this disclosure. The interferometer may be used to determine the relative phase shift variations between the light in interferometer arm 224 and interferometer arm 222 as they recombine. Interferometer arm 222 may comprise a gauge 223 in particular embodiments, which may cause the length of interferometer arm 222 to be longer than the length of interferometer arm 224. With different lengths between the two arms of the interferometer, a phase shift of backscattered light from two different points along the wellbore may be measured. The distance between those points may be half the length of the gauge 223 in the case of a Mach-Zehnder configuration, or equal to the gauge length in a Michelson interferometer configuration. The interferometric signal, i.e. the relative phase shift, will vary over the distance of optical fiber 226, and the location of the interferometric signal can be determined using time of flight for the interrogating pulse 216. In DAS system 201 of FIG. 2A, the interferometer is illustrated as a Mach-Zehnder interferometer, but it is not intended to be limited to such. For instance, in certain implementations, a Michelson interferometer or any other type of interferometer known to those of skill in the art having the benefit of this disclosure may also be used without departing from the scope of the present disclosure.

The interferometer may be coupled to a photodetector assembly 220. The photodetector assembly 220 may include associated optics and signal processing electronics, in particular embodiments. The photodetector assembly 220 may be a semiconductor electronic device that uses the photoelectric effect to convert light to electricity. The photodetector assembly 220 may be an avalanche photodiode or a pin photodiode but is not intended to be limited to such. As the light from interferometer arm 224 and interferometer arm 222 reach the third coupler 234, the photodetector assembly 220 may convert the optical signal (i.e., the interferometric signal) to an electronic signal proportional to the acoustic signal along optical fiber 226. The photodetector assembly 220 may be coupled to an information handling system 230. The photodetector assembly 220 and information handling system 230 may be communicatively and/or mechanically coupled. A first device may be communicatively coupled to a second device if it is connected to the second device through a wired or wireless communication network which permits the transmission of information. Thus, the information handling system 230 may be located uphole, downhole, or at a remote location. The information handling system 230 may also be communicatively or mechanically coupled to laser 211 and/or pulse generator 214, in certain embodiments, and may control the operations thereof.

In operation of the system 201, pulse generator 214 may generate an interrogating pulse 216 which is transmitted through first coupler 210 and down optical fiber 226. In certain implementations, pulse generator 214 may include an amplitude modulator or a laser connected to a switching amplifier (i.e. semiconductor optical amplifier (SOA)). In certain embodiments, at least a portion of optical fiber 226 may be arranged in coils 218, as illustrated in FIG. 2A. As the interrogating pulse 216 travels through the optical fiber 226, imperfections in optical fiber 226 may cause a portion of the light to be backscattered along optical fiber 226 due to Rayleigh scattering. Scattered light according to Rayleigh scattering is returned from every point along optical fiber 226 along the length of optical fiber 226 and is shown as backscattered light 228 in FIG. 2A. This backscatter effect may be referred to as Rayleigh backscatter. Density fluctuations in optical fiber 226 may give rise to energy loss due to the scattered light, with the following coefficient:

$$\alpha_{scat} = \frac{8\pi^3}{3\lambda^4} n^8 p^2 k T_f \beta$$

where n is the refraction index, p is the photoelastic coefficient of optical fiber 226, k is the Boltzmann constant, and β is the isothermal compressibility. $T_f$ is a fictive temperature, representing the temperature at which the density fluctuations are "frozen" in the material. Optical fiber 226 may be terminated with a low reflection device (not shown) in certain embodiments. In such implementations, the low reflection device may be a fiber coiled and tightly bent to violate Snell's law of total internal reflection such that all the remaining energy is sent out of the fiber. In other implementations, the low reflection device may be an angle cleaved fiber. In still other implementations, the low reflection device may be a coreless optical fiber with high optical attenuation. In still other implementations, the low reflection device may be a termination, such as an AFL ENDLIGHT.

Backscattered light 228 may travel back through optical fiber 226, until it reaches the second coupler 208. First coupler 210 may be mechanically coupled to second coupler 208 on one side by the optical fiber 232 such that backscattered light 228 may pass from first coupler 210 to second coupler 208 through the optical fiber 232. Second coupler 208 may split backscattered light 228 based on the number of interferometer arms so that one portion of any backscattered light 228 passing through the interferometer travels through interferometer arm 224 and another portion travels through interferometer arm 222. In other words, the second coupler 208 may split the backscattered light from the optical fiber 232 into a first backscattered pulse and a second backscattered pulse. The first backscattered pulse may be sent into interferometer arm 222, and the second backscattered pulse may be sent into interferometer arm 224. These two portions may be re-combined at third coupler 234, and at that point, they may generate an interferometric signal. In the interferometric signal, two signals may be superimposed from points along the wellbore separated by a distance of L, where L is the difference in length between interferometer arm 224 and interferometer arm 222 (i.e., the gauge length). The output from the interferometer, or the interferometric signal, includes back scattered interfered light from two positions. This interferometric signal may reach the photodetector assembly 220, where it may be converted to an electrical signal. The photodetector assembly may provide an electric signal proportional to the square of the sum of the two electric fields from the two arms of the interferometer. This signal is proportional to $P(t)=P_1+P_2+2*Sqrt(P_1P_2)\cos(\phi_1-\phi_2)$ where $P_n$ is the power incident to the photodetector from a particular arm (1 or 2) and $\phi_n$ is the phase of the light from the particular arm of the interferometer. The photodetector assembly 220 may provide output relating to the back scattered light 228 to the information handling system 230, which may convey the data to a display and/or store it in computer-readable media. In certain embodiments, information handling system 230 may perform one or more operations on the data from the photodetector assembly 220, such as one or more de-convolution operations as described further below.

In certain embodiments, such as DAS system 201 of FIG. 2B, a compensating interferometer may be placed in the launch path (i.e. prior to traveling down optical fiber 226) of the interrogating pulse 251 to generate a pair of pulses 252 that travel down optical fiber 226. In such embodiments, an additional interferometer may not be necessary to interfere the backscattered light 253 from pulses 252 prior to being sent to photo detector assembly 220. The compensation interferometer in the launch path of interrogating pulse 251 may be similar to the interferometer of FIG. 2A, with one arm of the interferometer comprising an extra length of fiber not present in the other arm (i.e., a gauge length similar to gauge 223 of FIG. 2A). In certain embodiments, to accommodate phase detection of backscattered light using system 202, one of the two arms of the interferometer may include an optical frequency shifter 261 (for example, an acousto-optic modulator) to shift the optical frequency of one of the pulses, while the other may include a gauge 271, as illustrated in FIG. 2A. This may allow using a single photodetector receiving the backscatter light to determine the relative phase of the backscatter light between two locations by examining the heterodyne beat signal received from the mixing of the light from different optical frequencies of the two interrogation pulses.

Although illustrated in FIGS. 2A-2B as comprising two arms (e.g., interferometer arm 224 and interferometer arm 222 of FIG. 2A), systems 201-202 may generate interferometric signals for analysis or processing by information handling system 230 without the use of a physical interferometer. For example, as illustrated in FIG. 2C, DAS system 203 may direct backscattered light to photo detector assembly 220 without first passing it through any interferometer. Referring to FIG. 2C, the backscattered light 282 from interrogation pulse 281 may be mixed with the light 291 from laser 211. In other words, the light from laser 211, the interrogation pulse 281, and the backscattered signal 282 may all be collected by photodetector 220 and then analyzed by information handling system 230. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along the fiber relative to a reference light source. Using this method, the gauge length can be applied by information handling system 230 after data has been recorded by subtracting the measured phase from any two locations along the fiber and tracking this phase difference between the two locations over time to obtain an acoustic signal recorded by the fiber between the two selected locations. In other words, the information handling system 230 may generate an interferometer in system 203 using software embedded therein. Accordingly, instructions embodied in computer-readable medium of information handling system 230 may be used to compare data from two backscattered light signals received at different times, essentially replicating the function of the interferometers in systems 201-202 of FIGS. 2A-2B.

Modifications, additions, or omissions may be made to FIGS. 2A-2C without departing from the scope of the present disclosure. For instance, interferometers of a DAS system in accordance with embodiments of the present disclosure may have more than two arms. As an example, the interferometer of DAS system 201 may have a third arm in addition to arms 222 and 224 with an additional gauge length. Accordingly, signals associated with multiple gauge lengths may be collected, analyzed, or processed by the DAS system. In addition, in particular embodiments, a continuously modulated interrogation signal may be emitted into optical fiber 226 instead of pulses. As an example, a phase, frequency, or amplitude modulator may be placed after laser 211 instead of pulse generator 214 to send a coded or spread-spectrum interrogation signals down optical fiber 226 to allow DAS data collection, analysis, and/or processing using information handling system 230. Furthermore, components illustrated in one of systems 201-203 may be used in the other illustrated embodiments. For example, coils 218 of FIG. 2A may be implemented in DAS systems 202-203. As another example, an interferometer used to interfere backscattered light signals (e.g., the interferometer illustrated in FIG. 2A) may also be incorporated into DAS system 202 of FIG. 2B. Moreover, components may be added to or removed from DAS systems 201-203 without departing from the scope of the present disclosure.

DAS data collection systems may be used to collect seismic information for a formation. As an example, DAS data collection systems may be used to collect VSP data as described above. In particular embodiments, a DAS data collection system such as those described above may send optical pulses down the fiber optic cable at a particular rate, portions of which may reflect back toward the optical pulse source at various lengths in the cable. These reflections may be measured at various time periods (which may coincide with the rate of the optical pulse generation) to measure strain changes in the fiber optic cable at various depths. In other words, one time sample of DAS data includes strain change information (and thus seismic information) for all DAS measured depths (i.e., channels) along a wellbore. Once the data is collected at various time samples, the data may be de-multiplexed to generate traces of data at the various data collection depths (i.e., channels). Each trace may thus indicate the seismic information at particular times at a particular depth in the wellbore. Using this information, properties of the formation may be determined. For example, the speed of a formation (i.e., the speed of sound in the formation) may be determined. As another example, the seismic data may be used to form underground images.

However, noise artifacts inherent to DAS data collection may be present in DAS data. For instance, seemingly infinite velocity events which occur across all channels at the same time may appear in the collected DAS data. Infinite velocity events or noise may be seen in DAS data as horizontal lines. These types of events may persist in time throughout the data, or they can be isolated events which contaminate only a discrete time window of the DAS data. Embodiments of the present disclosure, such as those described below, may reduce these infinite or near-infinite velocity noise events that may be present in collected DAS data.

Figure 3:
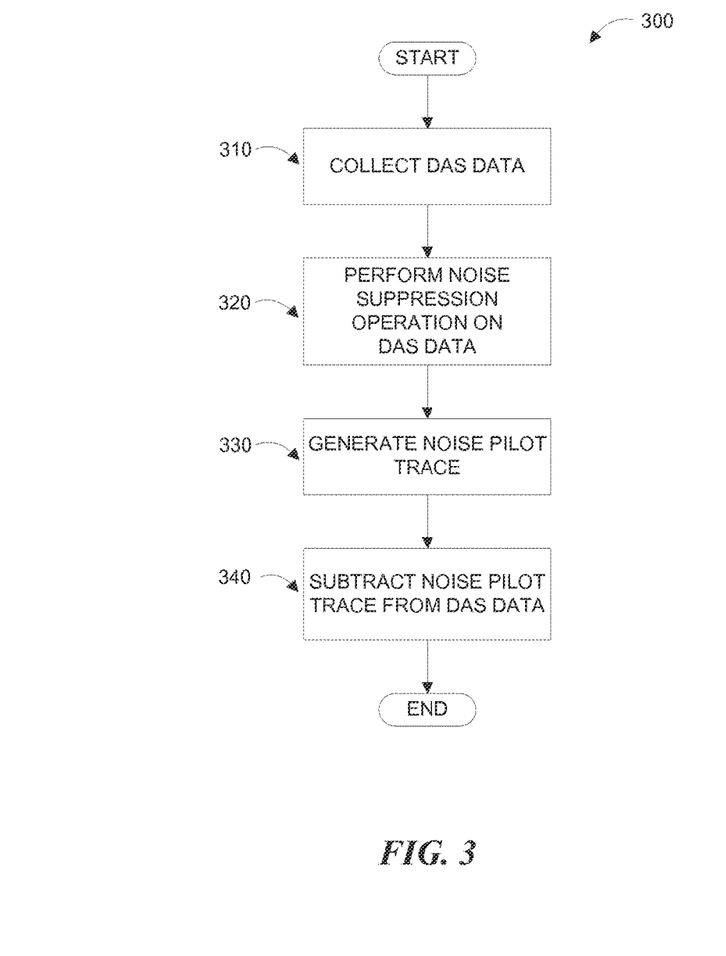
FIG. 3 illustrates an example method for removing noise from DAS data, in accordance with embodiments of the present disclosure.

FIG. 3 illustrates an example method 300 for removing noise from DAS data, in accordance with embodiments of the present disclosure. The method begins at step 310, where DAS data is collected. The DAS data may be collected using any suitable DAS data collection system, such as DAS data collection systems 201-203 of FIGS. 2A-2C, respectively. The DAS data may comprise seismic information that includes a number of traces. Each of the traces may be associated with a particular depth in a wellbore, in certain embodiments. As described above, the DAS data may include noise artifacts inherent to DAS data collection systems, such as infinite or near-infinite velocity noise events.

At step 320, a noise suppression operation is performed on the collected DAS data. The noise suppression operation may include any suitable operation for removing random or coherent noise from the DAS data. For example, in some embodiments, a frequency-space deconvolution filter operation (which may sometimes be referred to as an "f-x deconvolution" filter operation) may be applied to the DAS data. The f-x deconvolution operation may assist in removing random spikes and/or channel-to-channel uncorrelated noise in the DAS data, and may enhance the desired signal as well as the infinite velocity events. As another example, a bandpass or notch filter operation may be applied to the DAS data. A band pass filter, for instance, may limit the frequency range of the DAS data to the seismic source energy range, and thus remove extraneous noise signals in the data. As yet another example, in particular embodiments, the collected DAS data may be correlated with data from a vibroseis reference sweep. Once the noise suppression operation has been performed on the DAS data, the method proceeds to step 330.

At step 330, a noise pilot trace is generated. The noise pilot trace may be created by stacking certain or all of the traces in the collected DAS data. The stacking process may be performed through any suitable means, such as mean stacking or median stacking, or through weighted approaches to those stacking techniques (e.g., weighting particular traces more heavily than others prior to determining a mean). In some embodiments, only a subset of the traces in the collected DAS data may be stacked together to avoid including particular channels or depth levels with obviously large signal values. Because the optical fiber cable may extend all of the way from the surface to the bottom of a wellbore, certain of the recorded DAS channels may not be expected to contain seismic signals. These "unused" channels may exhibit the consistent channel-to-channel noise to be removed, and may accordingly be specifically selected to form the noise pilot trace, as discussed further below with respect to FIG. 4.

To create the noise pilot trace, a selection of traces in the collected DAS data (which may include some or all of the traces) is made such that the traces will adequately represent the trace-to-trace consistent noise. For example, the selection of traces to be included may be done according to data quality metrics associated the traces, in some embodiments. As another example, it may be that the trace selection is performed by choosing traces with lower overall amplitudes (e.g., using root mean square amplitudes), since lower amplitude traces will contain larger noise amplitude relative to the amplitude of the desired signal (i.e., lower signal-to-noise ratio). As yet another example, the selected traces may include those channels corresponding to portions of the fiber that are not expected to have desired seismic data captured, as described below with respect to FIG. 4.

Once the traces have been selected for use in generating the noise pilot trace, a stacking process of the selected traces may be performed to create the noise pilot trace. For example, each time sample of the noise pilot trace may be created by an averaging process of the corresponding time samples from each of the selected traces. The averaging process may take several forms, such as using the mean of the traces, the median of the traces, or any combination thereof. In particular embodiments, a weighting factor may be applied to each of the selected traces, which may de-emphasize traces on the edges of the selected range of traces, for example. The stacking process may thus consist of forming the mean or median of each of these weighted samples. The chosen stacking process may be repeated for each time sample of the noise pilot trace.

At step 340, the generated noise pilot trace is subtracted from the collected DAS data. The subtraction operation may yield cleaner DAS data, free of infinite or near-infinite velocity noise. This is because the noise pilot trace includes data with enhanced channel-to-channel infinite velocity noise signals (because the infinite velocity noise signals do not change from trace to trace) and greatly reduced desired signals (because the desired signals are changing from trace to trace). Thus, the noise pilot trace may be used as an estimate of the infinite velocity noise signal, and may therefore provide a more accurate representation of the desired DAS data signal with reduced noise when subtracted from the collected DAS data.

In certain embodiments, the subtraction operation may include a weighted subtraction operation, whereby particular traces of the noise pilot trace are given weighting factors prior to performing the subtraction operation. In addition, in certain embodiments, the subtraction operation may be performed by an adaptive manner. For instance, the subtraction operation may be done by applying a multiplicative scalar to the generated noise pilot trace in order to best match the amplitude of the noise before subtraction. After the noise pilot trace is subtracted from the collected DAS data, the infinite velocity noise may be highly attenuated and the data may be better suited for further data analysis.

It will be understood that the noise removal method 300 may be performed either during an acquisition preprocessing stage (i.e., while the DAS data is being collected) or at a later time in the conventional seismic data processing stage. During the acquisition stage, DAS data may be acquired by pulsing a laser at a rate of 10 kHz to 20 kHz, giving a sampling interval of between 0.1 ms and 0.05 ms. During the acquisition preprocessing stage, some additional band-pass filtering (such as to prevent aliasing) may be applied. The data may then be down sampled to approximately 1 kHz in some embodiments. This downsampling may make the final sampling interval of the collected DAS data approximately 1 ms. The noise pilot trace can be estimated during the acquisition preprocessing stage by adding the noise pilot trace determination and subtraction steps described above (i.e., steps 330 and 340, respectively) to the preprocessing flow. If the noise removal process is done during the later, conventional seismic processing stage, then a vibroseis reference sweep and pre-processing filters described above in step 320 may be additionally applied.

Modifications, additions, or omissions may be made to method 300 without departing from the scope of the present disclosure. For example, the order of the steps may be performed in a different manner than that described and some steps may be performed at the same time. Additionally, each individual step may include additional steps without departing from the scope of the present disclosure.

Figure 4:
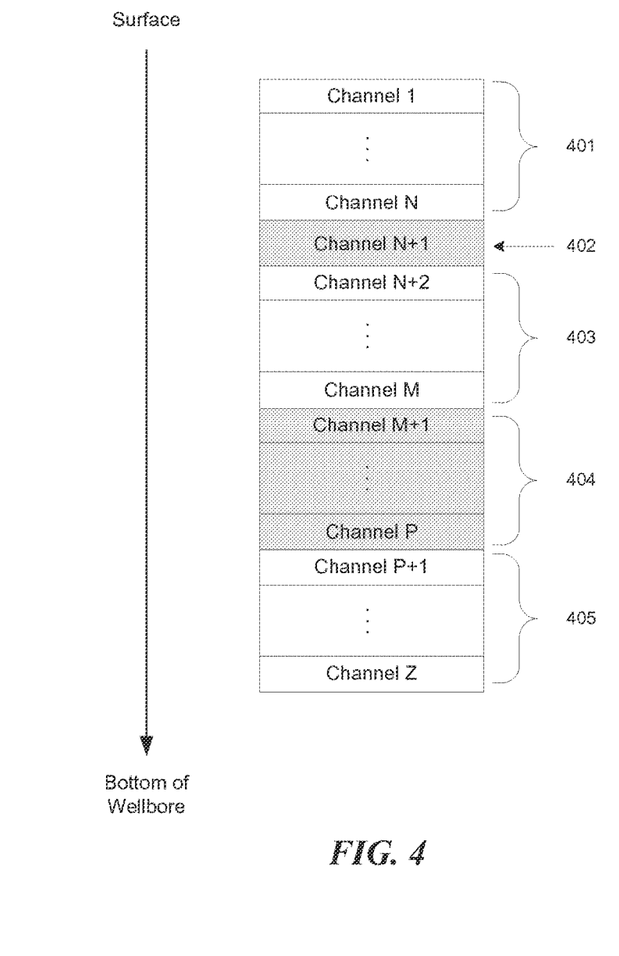
FIG. 4 illustrates example channels of a DAS data collection system, in accordance with embodiments of the present disclosure.

FIG. 4 illustrates example channels 401-405 of a DAS data collection system, in accordance with embodiments of the present disclosure. More particularly, FIG. 4 illustrates various channels (i.e., depths) of a wellbore at which a DAS data collection system may record (or not record) seismic data. The channels of the DAS data collection system may include channels 404 for collecting DAS data traces, such as DAS VSP data. The channels may also include channels that may not collect seismic data, such as channels 401 and 403 toward the surface of the wellbore and channels 405 toward the bottom of the wellbore. While these channels may not collect seismic data, they may contain the undesired infinite velocity events (since the coherent noise will occur across all DAS channels) that the present disclosure aims to attenuate. This may make these "silent" channels ideal candidates for noise pilot trace generation. Accordingly, particular embodiments may select these silent channels and generate the noise pilot trace using only the DAS data recorded in those channels. The channels may be selected, in some embodiments, based on a quality metric (e.g., root mean squared amplitudes of the data in the channels) that may depend on environmental conditions (e.g., some surface channels may be discarded or not included in the generation of the noise pilot trace). Generation of the noise pilot trace using only these silent channels may be performed using any of the methods described above (e.g., mean stacking, median stacking, or combinations thereof). Furthermore, certain embodiments may apply weighting factors to the channels, which may be based on quality metrics associated with the DAS data collected at the channels. For example, in a weighted mean stacking embodiment, more weight may be given to high quality channels (i.e., those with higher root mean square amplitudes) and less weight may be given to low quality channels (i.e., those with lower root mean square amplitudes). In addition, in certain embodiments, the channels of the DAS data collection system may include a channel 402 dedicated to VSP reference sweeps (e.g., a vibroseis reference sweep). The DAS data collected at these channels may be used for correlation with the collected DAS data prior to generation of the noise pilot trace, as described above with respect to step 320 of method 300.

Modifications, additions, or omissions may be made to FIG. 4 without departing from the scope of the present disclosure. For example, although one channel 402 dedicated to VSP reference sweeps is illustrated, a plurality of channels may be included for use with VSP reference sweeps. As another example, although one subset of channels 404 dedicated to seismic data collection is shown, any suitable number of DAS data channels may be dedicated to seismic data collection.

Figure 5A:
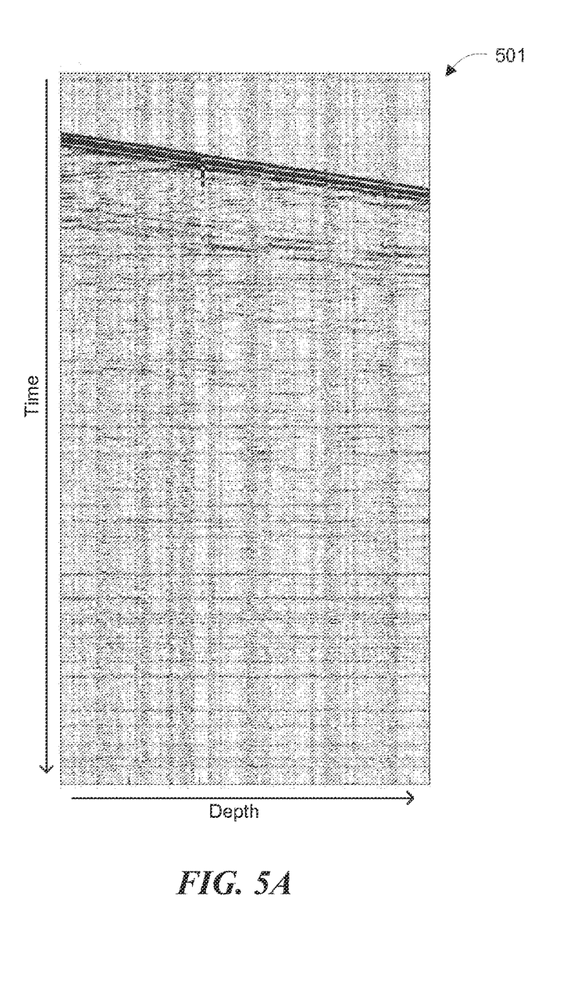
FIGS. 5A-5D depict steps of example noise reduction techniques on VSP data collected by a DAS data collection system, in accordance with embodiments of the present disclosure.
Figure 5B:
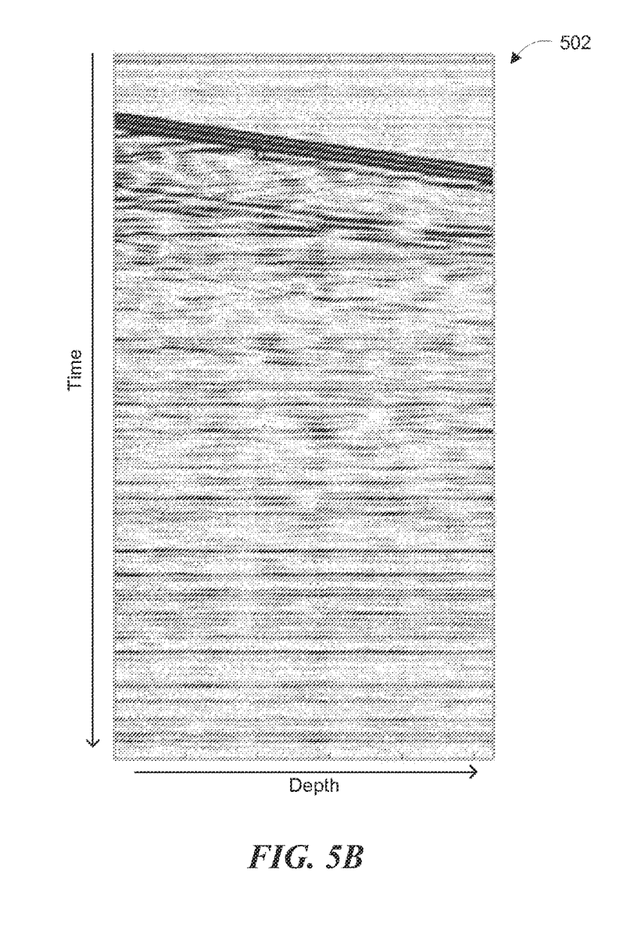
Figure 5C:
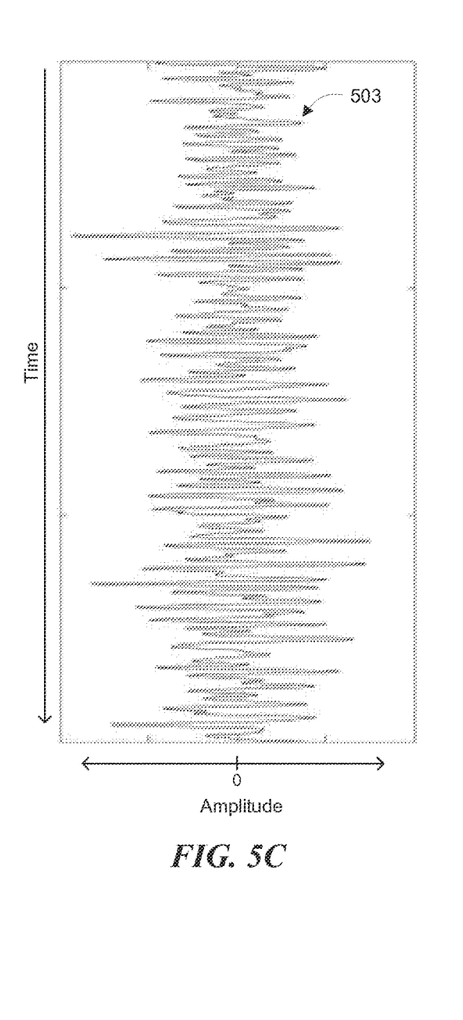
Figure 5D:
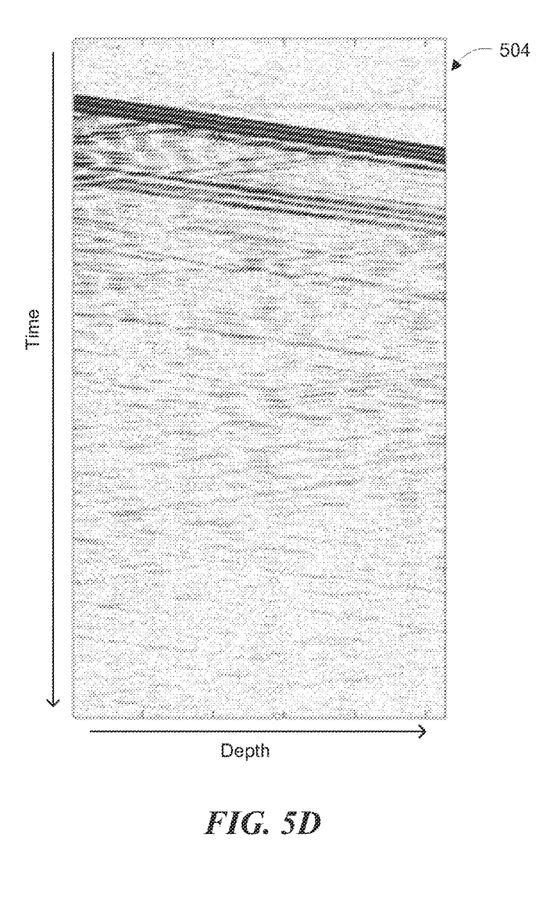

FIGS. 5A-5D depict steps of example noise reduction techniques on VSP data collected by a DAS data collection system, in accordance with embodiments of the present disclosure. In particular, FIG. 5A illustrates example VSP data 501 collected in a wellbore using a DAS data collection system (e.g., a DAS data collection system similar to those discussed above with respect to FIGS. 2A-2C). It will be understood that data 501 of FIG. 5A includes a desired data signal along with coherent and random noise, including infinite and near-infinite velocity noise events. Data 501 may accordingly be representative of DAS data collected at step 310 of method 300. FIG. 5B illustrates data 502 that is a result of applying a f-x deconvolution filter operation to data 501 of FIG. 5A. It will be seen that the f-x deconvolution filter operation may reduce the random noise seen in data 501 of FIG. 5A. Data 502 may accordingly be representative of the result of applying a noise suppression operation on collected DAS data at step 320 of method 300. FIG. 5C illustrates a noise pilot trace 503 that is a result of stacking traces of data 502 in FIG. 5B together. Noise pilot trace 503 may be considered to be an estimate of the trace-to-trace coherent noise in data 502 of FIG. 5B, and may be representative of the result of step 330 of method 300. FIG. 5D illustrates data 504 that is a result of subtracting noise pilot trace 503 of FIG. 5C from data 502 of FIG. 5B, and may be representative of the result of step 340 of method 300. It will therefore be seen from a comparison of FIGS. 5D and 5A that the noise attenuation operation of the present disclosure may effectively eliminate much of both the coherent and random noise present in collected DAS data.

To provide illustrations of one or more embodiments of the present disclosure, the following examples are provided.

In one or more embodiments, a system comprises a distributed acoustic sensing (DAS) data collection system and an information handling system coupled to the DAS data collection system. The information handling system is configured to receive seismic information from the DAS data collection system, the seismic information comprising seismic traces associated with a plurality of depths in the wellbore, generate a noise pilot trace by stacking one or more of the seismic traces, and subtract the noise pilot trace from the seismic information received from the DAS data collection system.

In one or more of the embodiments described in the preceding paragraph, the information handling system is further configured to apply a noise suppression operation to the one or more seismic traces.

In one or more of the embodiments described in the preceding paragraph, the noise suppression operation comprises a frequency-space deconvolution filter operation. In one or more of the embodiments described in the preceding paragraph, the noise suppression operation comprises a notch filter operation. In one or more of the embodiments described in the preceding paragraph, the noise suppression operation comprises a band pass filter operation. In one or more of the embodiments described in the preceding paragraph, the noise suppression operation comprises correlating the seismic traces with a vibroseis reference sweep.

In one or more of the embodiments described in the preceding three paragraphs, stacking one or more of the seismic traces comprises stacking a subset of the seismic traces. In one or more of the embodiments described in the preceding three paragraphs, stacking one or more of the seismic traces comprises mean stacking one or more of the seismic traces. In one or more of the embodiments described in the preceding three paragraphs, stacking one or more of the seismic traces comprises median stacking one or more of the seismic traces. In one or more of the embodiments described in the preceding three paragraphs, stacking one or more of the seismic traces comprises applying weighting factors to one or more of the seismic traces.

In one or more of the embodiments described in the preceding four paragraphs, the seismic information is received by the DAS data collection system in response to vibrations being produced in a formation.

In one or more embodiments, a method comprises receiving seismic information from a distributed acoustic sensing (DAS) data collection system, the seismic information comprising seismic traces associated with a plurality of depths in the wellbore, generating a noise pilot trace by stacking one or more of the seismic traces, and subtracting the noise pilot trace from the seismic information received from the DAS data collection system.

In one or more embodiments described in the preceding paragraph, the method further comprises applying a noise suppression operation to the one or more seismic traces. In one or more embodiments described in the preceding paragraph, the noise suppression operation comprises a frequency-space deconvolution filter operation. In one or more embodiments described in the preceding paragraph, the noise suppression operation comprises a notch filter operation. In one or more embodiments described in the preceding paragraph, the noise suppression operation comprises a band pass filter operation In one or more embodiments described in the preceding paragraph, the noise suppression operation comprises correlating the seismic traces with a vibroseis reference sweep.

In one or more embodiments described in the preceding two paragraphs, stacking one or more of the seismic traces comprises stacking a subset of the seismic traces. In one or more embodiments described in the preceding two paragraphs, stacking one or more of the seismic traces comprises mean stacking one or more of the seismic traces. In one or more embodiments described in the preceding two paragraphs, stacking one or more of the seismic traces comprises median stacking one or more of the seismic traces. In one or more embodiments described in the preceding two paragraphs, stacking one or more of the seismic traces comprises applying weighting factors to one or more of the seismic traces.

In one or more embodiments described in the preceding three paragraphs, the seismic information is received by the DAS data collection system in response to vibrations being produced in a formation.

In one or more embodiments, a computer-readable medium comprises instructions that, when executed by a processor, cause a processor to receive seismic information from a distributed acoustic sensing (DAS) data collection system, the seismic information comprising seismic traces associated with a plurality of depths in the wellbore, generate a noise pilot trace by stacking one or more of the seismic traces, and subtract the noise pilot trace from the seismic information received from the DAS data collection system.

In one or more embodiments described in the preceding paragraph, the instructions, when executed, further cause the processor to apply a noise suppression operation to the one or more seismic traces. In one or more embodiments described in the preceding paragraph, the noise suppression operation comprises a frequency-space deconvolution filter operation. In one or more embodiments described in the preceding paragraph, the noise suppression operation comprises a notch filter operation. In one or more embodiments described in the preceding paragraph, the noise suppression operation comprises a band pass filter operation. In one or more embodiments described in the preceding paragraph, the noise suppression operation comprises correlating the seismic traces with a vibroseis reference sweep.

In one or more embodiments described in the preceding two paragraphs, stacking one or more of the seismic traces comprises stacking a subset of the seismic traces. In one or more embodiments described in the preceding two paragraphs, stacking one or more of the seismic traces comprises mean stacking one or more of the seismic traces. In one or more embodiments described in the preceding two paragraphs, stacking one or more of the seismic traces comprises median stacking one or more of the seismic traces. In one or more embodiments described in the preceding two paragraphs, stacking one or more of the seismic traces comprises applying weighting factors to one or more of the seismic traces.

In one or more embodiments described in the preceding three paragraphs, the seismic information is received by the DAS data collection system in response to vibrations being produced in a formation.

Illustrative embodiments of the present disclosure have been described in detail herein. In the interest of clarity, not all features of an actual implementation may be described in this specification. It will of course be appreciated that in the development of any actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The terms "couple" or "couples" as used herein are intended to mean either an indirect or a direct connection. Thus, if a first device couples to a second device, that connection may be through a direct connection, or through an indirect electrical or mechanical connection via other devices and connections. The term "upstream" as used herein means along a flow path towards the source of the flow, and the term "downstream" as used herein means along a flow path away from the source of the flow. The term "uphole" as used herein means along the drill string or the hole from the distal end towards the surface, and "downhole" as used herein means along the drill string or the hole from the surface towards the distal end.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory ("RAM"), one or more processing resources such as a central processing unit ("CPU") or hardware or software control logic, ROM, and/or other types of nonvolatile memory. Additional components of the information handling system may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

The present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A system, comprising:
  a distributed acoustic sensing (DAS) data collection system coupled to at least one optical fiber at least partially positioned within a wellbore; and
  an information handling system coupled to the DAS data collection system, the information handling system comprising a processor and a memory device coupled to the processor, the memory device containing a set of instruction that, when executed by the processor, cause the processor to:
    receive seismic information from the DAS data collection system, the seismic information comprising seismic traces associated with a plurality of depths in the wellbore, wherein the seismic traces comprise infinite or near infinite velocity noise events inherent to the DAS data collection system;

collect a selection of traces, wherein the selection of traces comprises one or more of the seismic traces that represent a trace-to-trace consistent noise;

generate a noise pilot trace by stacking the selection of traces, wherein the noise pilot trace is an estimate of the infinite or near infinite velocity noise events;

subtract the noise pilot trace from the seismic information received from the DAS data collection system; and provide a reduced noise seismic information based on the subtraction.

2. The system of claim 1, wherein the set of instructions, when executed by the processor, further cause the processor to apply a noise suppression operation to the one or more seismic traces.

3. The system of claim 2, wherein the noise suppression operation comprises a frequency-space deconvolution filter operation.

4. The system of claim 2, wherein the noise suppression operation comprises a notch filter operation.

5. The system of claim 2, wherein the noise suppression operation comprises a band pass filter operation.

6. The system of claim 2, wherein the noise suppression operation comprises correlating the seismic traces with a vibroseis reference sweep.

7. The system of claim 1, wherein stacking one or more of the seismic traces comprises stacking a subset of the seismic traces.

8. The system of claim 1, wherein stacking one or more of the seismic traces comprises mean stacking one or more of the seismic traces.

9. The system of claim 1, wherein stacking one or more of the seismic traces comprises median stacking one or more of the seismic traces.

10. The system of claim 1, wherein stacking one or more of the seismic traces comprises applying weighting factors to one or more of the seismic traces.

11. The system of claim 1, wherein the seismic information is received by the DAS data collection system in response to vibrations being produced in a formation.

12. A method, comprising:
receiving seismic information from a distributed acoustic sensing (DAS) data collection system coupled to at least one optical fiber that is at least partially positioned within a wellbore, the seismic information comprising seismic traces associated with a plurality of depths in the wellbore, wherein the seismic traces comprise infinite or near infinite velocity noise events inherent to the DAS data collection system;

collecting a selection of traces, wherein the selection of traces comprises one or more of the seismic traces that represent a trace-to-trace consistent noise;

generating a noise pilot trace by stacking the selection of traces, wherein the noise pilot trace is an estimate of the infinite or near infinite velocity noise events;

subtracting the noise pilot trace from the seismic information received from the DAS data collection system; and providing a reduced noise seismic information based on the subtraction.

13. The method of claim 12, further comprising applying a noise suppression operation to the one or more seismic traces.

14. The method of claim 13, wherein the noise suppression operation comprises a frequency-space deconvolution filter operation.

15. The method of claim 13, wherein the noise suppression operation comprises a notch filter operation.

16. The method of claim 13, wherein the noise suppression operation comprises a band pass filter operation.

17. The method of claim 13, wherein the noise suppression operation comprises correlating the seismic traces with a vibroseis reference sweep.

18. The method of claim 12, wherein stacking one or more of the seismic traces comprises stacking a subset of the seismic traces.

19. The method of claim 12, wherein stacking one or more of the seismic traces comprises mean stacking one or more of the seismic traces.

20. The method of claim 12, wherein stacking one or more of the seismic traces comprises median stacking one or more of the seismic traces.

21. The method of claim 12, wherein stacking one or more of the seismic traces comprises applying weighting factors to one or more of the seismic traces.

22. The method of claim 12, wherein the seismic information is received by the DAS data collection system in response to vibrations being produced in a formation.

23. A non-transitory computer-readable medium comprising instructions that, when executed by a processor, cause a processor to:
receive seismic information from a distributed acoustic sensing (DAS) data collection system coupled to at least one optical fiber that is at least partially positioned within a wellbore, the seismic information comprising seismic traces associated with a plurality of depths in the wellbore, wherein the seismic traces comprise infinite or near infinite velocity noise events inherent to the DAS data collection system;

collect a selection of traces, wherein the selection of traces comprises one or more of the seismic traces that represent a trace-to-trace consistent noise;

generate a noise pilot trace by stacking the selection of traces, wherein the noise pilot trace is an estimate of the infinite or near infinite velocity noise events;

subtract the noise pilot trace from the seismic information received from the DAS data collection system; and provide a reduced noise seismic information based on the subtraction.

24. The non-transitory computer-readable medium of claim 23, wherein the instructions, when executed, further cause the processor to apply a noise suppression operation to the one or more seismic traces.

25. The non-transitory computer-readable medium of claim 24, wherein the noise suppression operation comprises a frequency-space deconvolution filter operation.

26. The non-transitory computer-readable medium of claim 24, wherein the noise suppression operation comprises a notch filter operation.

27. The non-transitory computer-readable medium of claim 24, wherein the noise suppression operation comprises a band pass filter operation.

28. The non-transitory computer-readable medium of claim 24, wherein the noise suppression operation comprises correlating the seismic traces with a vibroseis reference sweep.

29. The non-transitory computer-readable medium of claim 23, wherein stacking one or more of the seismic traces comprises stacking a subset of the seismic traces.

30. The non-transitory computer-readable medium of claim 23, wherein stacking one or more of the seismic traces comprises mean stacking one or more of the seismic traces.

31. The non-transitory computer-readable medium of claim 23, wherein stacking one or more of the seismic traces comprises median stacking one or more of the seismic traces.

32. The non-transitory computer-readable medium of claim 23, wherein stacking one or more of the seismic traces comprises applying weighting factors to one or more of the seismic traces.

33. The non-transitory computer-readable medium of claim 23, wherein the seismic information is received by the DAS data collection system in response to vibrations being produced in a formation.

\* \* \* \* \*